United States Patent
Schediwy

(10) Patent No.: US 9,916,051 B2
(45) Date of Patent: *Mar. 13, 2018

(54) DEVICE AND METHOD FOR PROXIMITY SENSING WITH FORCE IMAGING

(71) Applicant: Synaptics Incorporated, San Jose, CA (US)

(72) Inventor: Richard R. Schediwy, Union City, CA (US)

(73) Assignee: Synaptics Incorporated, San Jose, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 14/885,976

(22) Filed: Oct. 16, 2015

(65) Prior Publication Data

US 2016/0041653 A1    Feb. 11, 2016

Related U.S. Application Data

(63) Continuation of application No. 13/930,749, filed on Jun. 28, 2013, now Pat. No. 9,201,468.

(51) Int. Cl.
  *G06F 3/041* (2006.01)
  *G06F 3/044* (2006.01)
  *G06F 1/16* (2006.01)

(52) U.S. Cl.
  CPC ........... *G06F 3/044* (2013.01); *G06F 1/1692* (2013.01); *G06F 3/0414* (2013.01); *G06F 2203/04103* (2013.01); *G06F 2203/04112* (2013.01)

(58) Field of Classification Search
  CPC ...... G06F 1/1692; G06F 3/0414; G06F 3/044; G06F 2203/04103; G06F 2203/04112
  USPC ............................... 178/18.06; 345/173, 174
  See application file for complete search history.

(56) References Cited

U.S. PATENT DOCUMENTS

| | | | |
|---|---|---|---|
| 5,510,813 | A | 4/1996 | Makinwa et al. |
| 5,942,733 | A | 8/1999 | Allen et al. |
| 6,002,389 | A | 12/1999 | Kasser |
| 7,154,481 | B2 | 12/2006 | Cross et al. |

(Continued)

FOREIGN PATENT DOCUMENTS

| | | |
|---|---|---|
| CN | 101071354 A | 11/2007 |
| CN | 103049146 A | 4/2013 |
| CN | 202854776 U | 4/2013 |

OTHER PUBLICATIONS

PCT International Search Report for International Application No. PCT/US2014/038775 dated Oct. 28, 2014 (12 pages).

(Continued)

*Primary Examiner* — Amr Awad
*Assistant Examiner* — Aaron Midkiff
(74) *Attorney, Agent, or Firm* — FBFK, PC

(57) ABSTRACT

Methods, systems and devices are described for operating an electronic system which includes a first plurality of sensor electrodes disposed in a first layer and configured to detect input objects at an input surface of the input device, the first plurality of sensor electrodes including a first subset of transmitter electrodes; a second plurality of sensor electrodes configured to detect a force imparted to the input surface and configured for capacitive coupling with the first subset of transmitter electrodes; and a compressible dielectric configured to compress in response to force applied to the input surface. The capacitive coupling between the transmitter electrodes and the second plurality of sensor electrodes is configured to vary in response to the applied force.

17 Claims, 6 Drawing Sheets

(56) References Cited

U.S. PATENT DOCUMENTS

| | | |
|---|---|---|
| 7,395,717 B2 | 7/2008 | DeAngelis et al. |
| 7,538,760 B2 | 5/2009 | Hotelling et al. |
| 8,063,886 B2 | 11/2011 | Serban et al. |
| 8,627,716 B2 | 1/2014 | Son |
| 2001/0013855 A1 | 8/2001 | Fricker et al. |
| 2003/0234769 A1 | 12/2003 | Cross et al. |
| 2004/0090429 A1 | 5/2004 | Geaghan et al. |
| 2006/0260417 A1 | 11/2006 | Son et al. |
| 2007/0229464 A1 | 10/2007 | Hotelling et al. |
| 2007/0236466 A1 | 10/2007 | Hotelling |
| 2008/0174321 A1 | 7/2008 | Kang et al. |
| 2009/0091551 A1 | 4/2009 | Hotelling et al. |
| 2009/0267916 A1 | 10/2009 | Hotelling |
| 2009/0314621 A1 | 12/2009 | Hotelling |
| 2010/0242629 A1 | 9/2010 | Leuenberger et al. |
| 2010/0253651 A1 | 10/2010 | Day |
| 2010/0282000 A1 | 11/2010 | Gorjanc et al. |
| 2011/0227872 A1 | 9/2011 | Huska et al. |
| 2011/0278078 A1 | 11/2011 | Schediwy et al. |
| 2012/0013573 A1 | 1/2012 | Liu et al. |
| 2012/0026124 A1 | 2/2012 | Li et al. |
| 2012/0038583 A1 | 2/2012 | Westhues et al. |
| 2012/0062245 A1 | 3/2012 | Bao et al. |
| 2012/0105367 A1 | 5/2012 | Son et al. |
| 2012/0200337 A1 | 8/2012 | Liu et al. |
| 2012/0206401 A1 | 8/2012 | Lin et al. |
| 2012/0256876 A1 | 10/2012 | Yeh et al. |
| 2013/0021089 A1 | 1/2013 | Sakurai et al. |
| 2015/0130742 A1 | 5/2015 | Chen et al. |

OTHER PUBLICATIONS

Office Action issued in Chinese Patent Application No. 201480047435.X dated Jun. 14, 2017 (15 pages).

DEVICE AND METHOD FOR PROXIMITY SENSING WITH FORCE IMAGING

CROSS-REFERENCE TO RELATED APPLICATION

The present application is a continuation application of and, thereby, claims benefit under 35 U.S.C. § 120 to U.S. application Ser. No. 13/930,749, entitled, "DEVICE AND METHOD FOR PROXIMITY SENSING WITH FORCE IMAGING," filed on Jun. 28, 2013, and incorporated herein by reference.

TECHNICAL FIELD

This invention generally relates to electronic devices, and more specifically relates to sensor devices and using sensor devices for producing user interface inputs.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Some input devices also have the ability to detect applied force in the "Z" direction in addition to determining "X-Y" coordinate information for input objects interacting with a sensing region of the input device. However, in presently known force/proximity input devices the limitations of the sensitivity and accuracy of the force sensors limit the flexibility and usability of presently known force enabled input devices. A proximity sensor with enhanced force sensing sensitivity is thus needed.

BRIEF SUMMARY

Embodiments of the present invention provide a device and method that facilitates improved device usability. The device and method provide improved user interface functionality by strategically arranging an elastomeric layer and a layer of rigid spacer dots between the force transmitter and force receiver electrodes. In response to applied force, the transmitter and receiver electrodes are urged closer together, changing the capacitance therebetween in a detectable way. Also in response to applied force, the elastomer fills the volume between the spacer dots, changing the effective dielectric constant between the transmitter and receiver electrodes as a function of applied force.

A processing system associated with the proximity sensor may be configured to detect changes in capacitance resulting from i) the change in distance and ii) the change in effective dielectric constant between the transmitter and receiver electrodes. In this way, force information for one or more input objects may be obtained.

BRIEF DESCRIPTION OF DRAWINGS

The preferred exemplary embodiment of the present invention will hereinafter be described in conjunction with the appended drawings, where like designations denote like elements, and.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate enhanced force sensing capability and, hence, improved usability. Force sensitivity may be enhanced by providing the input device with a compliant (or pliable) top layer and an elastomeric layer which conforms locally around the spacer dotes in response to applied pressure. As the elastomeric layer conforms around the spacer dots and displaces the air from the volume surrounding the spacer dots, the dielectric constant in the region between the transmitter and receiver electrodes becomes dominated by the elastomer. This change in dielectric constant, coupled with the change in distance between the transmitter and receiver electrodes, facilitates enhanced force imaging in response to bending or translation of the input surface.

Figure 1:
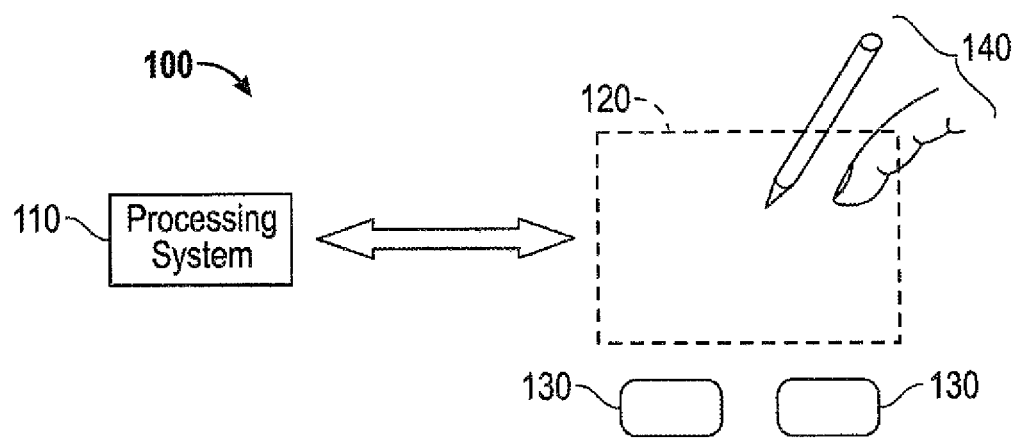
FIG. 1 is a block diagram of an exemplary electronic system that includes an input device and a processing system in accordance with an embodiment.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 includes sensors for detecting force and proximity, as described in greater detail below in conjunction with FIG. 2. Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The input device 100 may utilize any combination of sensor components and sensing technologies to detect user input (e.g., force, proximity) in the sensing region 120 or otherwise associated with the touchpad. The input device 100 comprises one or more sensing elements for detecting user input. As several non-limiting examples, the input device 100 may use capacitive, resistive, inductive, magnetic, acoustic, ultrasonic, and/or optical techniques.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage is applied to create an electric field. Nearby input objects cause changes in the electric field, and produce detectable changes in capacitive coupling that may be detected as changes in voltage, charge, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate to the input surface and configured to provide an electrical signal representative of an absolute or a change in force applied onto the input surface. In some embodiments, the input device may be configured to determine force information based on a deflection of the input surface relative to a stationary conductor (e.g. a display screen underlying the input surface). In some embodiments, the input surface may be configured to deflect about one or multiple axis. In some embodiments, the input surface may be configured to deflect in a substantially uniform or non-uniform manner.

In FIG. 1, a processing system 110 is shown as part of the input device 100. However, in other embodiments the processing system may be located in the host electronic device with which the touchpad operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central, processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons 130 may be placed near the sensing region 120 and used to facilitate selection of items using the input device 102. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. For example, in some embodiments, input information for an input object comprising, a force value F, a location X,Y and a time of contact T may result in a first action. While input information for an input object comprising a force value F', a location X',Y' and a time of contact T' (where the prime values are uniquely different from the non-prime values) may also result in the first action. Furthermore, input information for an input object comprising a force value F, a location X',Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said valves or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

Figure 2:
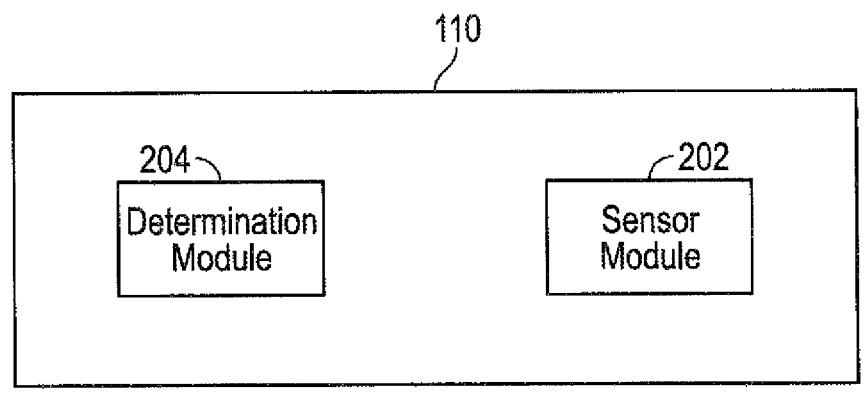
FIG. 2 is a schematic view of an exemplary processing system in accordance with an embodiment.

Referring now to FIGS. 1 and 2, the processing system 110 includes a sensor module 202 and a determination module 204. Sensor module 202 is configured to receive resulting signals from the sensors associated with sensing region 120. Determination module 204 is configured to process the data, and to determine positional information and force information. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 3:
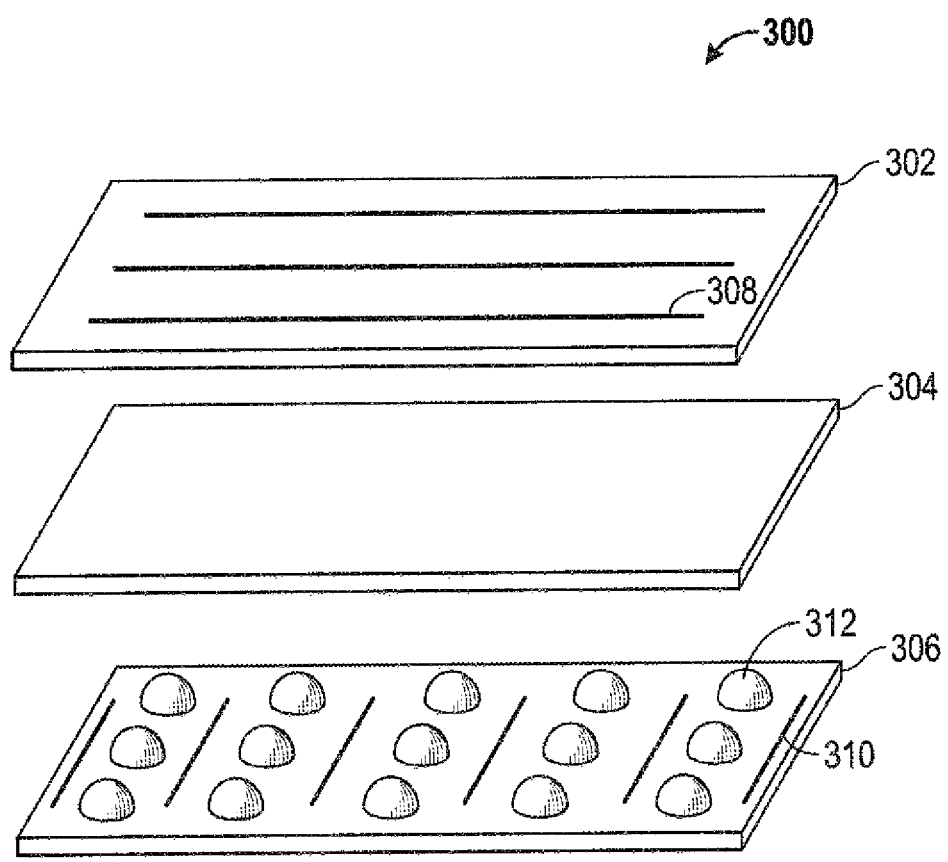
FIG. 3 is an exploded view of an input sensor stack-up including an elastomeric layer and a layer of spacer dots disposed between a force transmitter electrode layer and a force receiver electrode layer in accordance with an embodiment.

Referring now to FIG. 3, an input device 300 includes a pliable component 302, a compressible dielectric layer 304 (e.g., elastomeric silicone), and a rigid force sensor substrate 306. The pliable component 302 may include a cover sheet overlaying the touch surface and a display (not shown), such as a liquid crystal diode (LCD) display. A first set of force electrodes, for example transmitter electrodes 308, are disposed on the underside of (or proximate) the pliable component 302, and a second set of force electrodes, for example receiver electrodes 310, are disposed on substrate 306. In various embodiments, a set of touch receiver electrodes (not shown in FIG. 3) may also be disposed on or proximate the pliable component 302.

In the illustrated example, each transmitter electrode and each receiver electrode are configured to form an area of localized capacitance, referred to as a "pixel". In some embodiments, the area of localized capacitance may be varied due to the presence of an input object in the sensing region. In some embodiments, the area of localized capacitance may be varied due to applied pressure onto the pliable component. In a further embodiment, one or both of the force receiver electrodes and touch receiver electrodes may be subdivided into a plurality of respective segments or pixels to enhance the resolution of the touch and force sensing information derived from the touch and force receiver electrodes. A drive signal applied to one of the transmitter electrodes 308 causes capacitive coupling to receiver electrode 310. This capacitive coupling is based at least in part on the dielectric values of the surrounding layers, the magnitude of the drive signal, and the distance between the electrodes.

With continued reference to FIG. 3, a layer of spacer dots 312 is interposed between the first set of force electrodes 308 and the second set of force electrodes 310. Force applied by an input object (not shown in FIG. 3) to the top of pliable component 302 causes the elastomeric layer 304 to compress and deform locally around one or more spacer dots 312 in the vicinity of the applied force. That is to say, one or more spacer dots is substantially surrounded by the elastomeric layer, displacing the air from the immediate region and filling the region with elastomeric material. Because the dielectric constant (also referred to as permittivity) of the elastomeric material is different (e.g., higher) than the dielectric constant of air, the effective dielectric constant in the region of the penetrating spacer dot changes responsive to applied force. This local change in permittivity, coupled with the change in distance between the transmitter and receiver electrodes, causes a detectable change in local capacitance in response to applied force.

Figure 4:
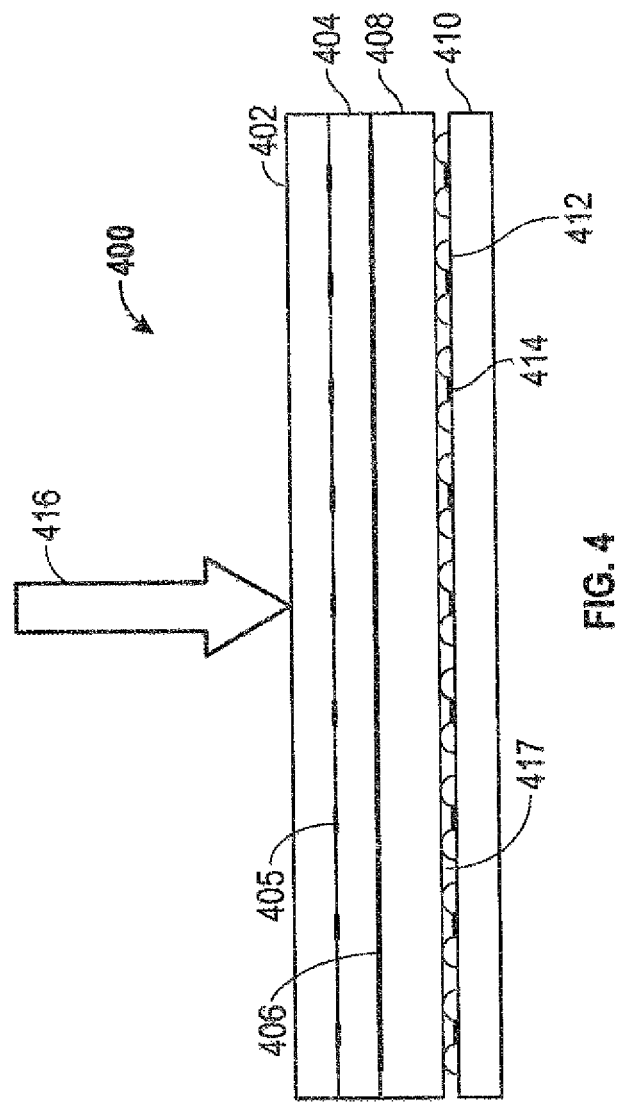
FIG. 4 is a cross section view of an exemplary input sensor having and a compressible dielectric layer sandwiched between a force transmitter electrode layer and a force receiver electrode layer, showing the spacer dots disposed on the rigid force sensor substrate layer in accordance with an embodiment.

More particularly and referring now to FIG. 4, a cross section view of an exemplary input sensor stack-up 400 includes a flexible face sheet 402 (e.g., plastic), a sensor substrate layer 404 (e.g., flexible polyester film made from polyethylene terephthalate (PET)), an elastomer layer 408, and a rigid (e.g., plastic) force sensor substrate layer 410. Sensor substrate layer 404 supports a set of touch sensor electrodes 405, for example, touch receiver electrodes, and a first set of force sensor electrodes 406 which may be configured to function as both touch sensor transmitter electrodes and force sensor transmitter electrodes.

In the illustrated embodiment, the force sensor substrate layer 410 supports a second set 414 of electrodes, for example, force receiver electrodes, as well as an array 412 of spacer dots. In the absence of applied force by an input object 416, the area 417 surrounding the spacer dots is occupied by a gas such as air. As described in greater detail below in connection with FIGS. 6-8, applied force causes one or more spacer dots in the vicinity of the applied force to penetrate into the elastomeric layer 408 and displace the surrounding air, thereby changing (e.g., increasing) the local effective dielectric constant, resulting in a measurable change in capacitance by the second set of sensor electrodes 414 indicative of the magnitude of applied force.

Figure 5:
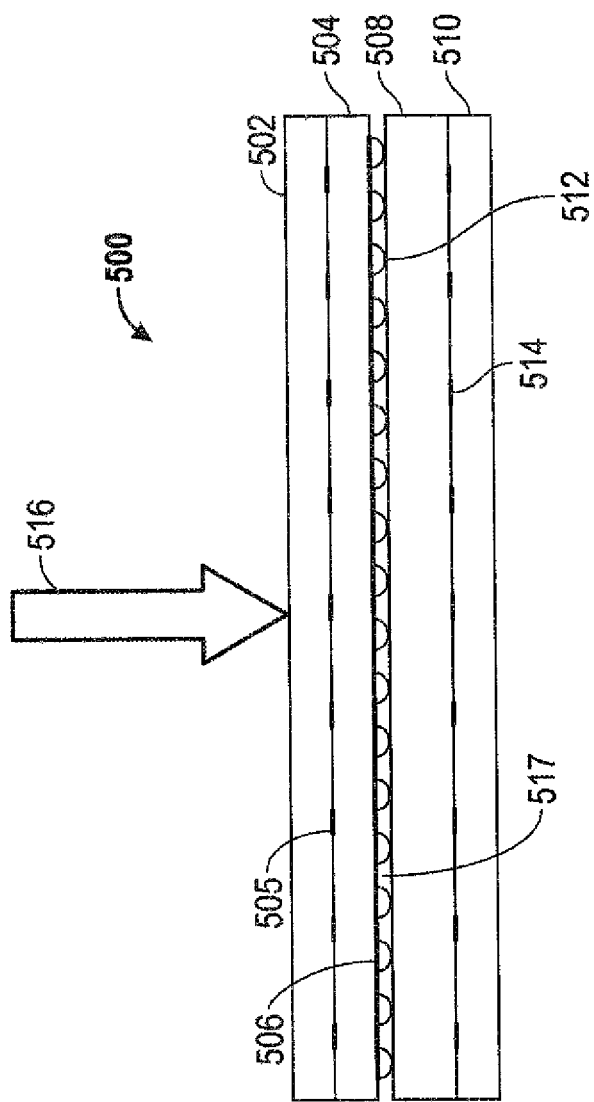
FIG. 5 is a cross section view of an the input sensor of FIG. 4, but with the spacer dots disposed on the pliable substrate layer in accordance with an embodiment.

FIG. 5 illustrates an alternative configuration of an exemplary input sensor stack-up 500 including a flexible face sheet 502, a flexible sensor substrate layer 504, an elastomer layer 508, and a rigid force sensor substrate layer 510. Sensor substrate layer 504 supports touch receiver electrodes 505 and transmitter electrodes 506. In the alternate embodiment shown in FIG. 5, the touch sensor substrate layer 504 supports an array 512 of spacer dots such that the elastomeric layer 508 is sandwiched between the force sensor substrate 510 and the spacer dots 512. In the absence of applied force by an input object 516, the area 517 surrounding the spacer dots comprises a gas (e.g., air).

Figure 6:
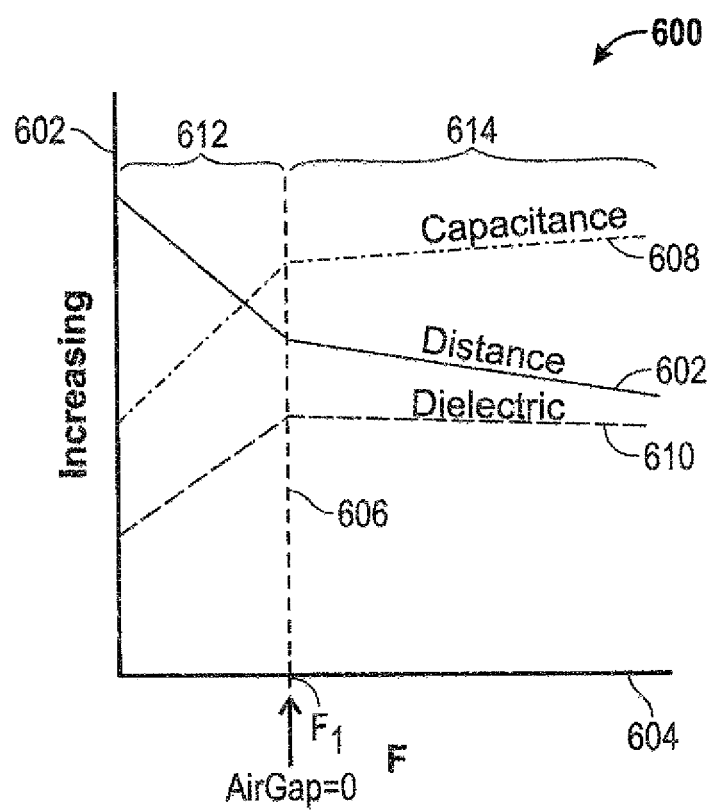
FIG. 6 is a graph of distance between a force transmitter electrode layer and a force receiver electrode layer versus applied force, illustrating an inverse relationship between the effective dielectric constant and capacitance as air is replaced by elastomer in accordance with an embodiment.

FIG. 6 depicts a graph 600 of applied force F (X-axis 604) on to an input surface and the change in distance (602), the dielectric constant (610) and resulting capacitance (608) between a force transmitter and force receiver electrodes, as a spacer dot moves toward and penetrates the elastomer, and the surrounding air is replaced by the compressible elastomer material. More particularly, as the local distance between a force transmitter electrode layer and a force receiver electrode layer decreases with applied force, the effective dielectric value increases sharply until the air is replaced by elastomeric material in the vicinity of the applied force, as shown in air displacement region 612 of the graph. Thereafter, as additional force (force greater than force level $F_1$) is applied and the distance between the force transmitter electrode layer and the force receiver electrode layer further decreases below a distance $D_1$, the elastomeric material compresses, resulting in a more gradual change (or no change at all) in the effective dielectric constant, as shown in region 614 of line 610.

With continued reference to FIG. 6, line 608 shows that the capacitance between a force transmitter electrode and a force receiver electrode increases sharply as the air is replaced by elastomeric material in the vicinity of the applied force, as shown in air displacement region 612 of the graph. As additional force is applied, the distance between the transmitter electrode and the receiver electrode further decreases and the elastomeric material compresses, resulting in a more gradual change in the capacitance, as shown in region 614 of line 608. This gradual change in capacitance in region 614 is primarily attributable to the decrease in distance between the transmitter and receiver electrodes, inasmuch as the dielectric constant does not change substantially as the elastomeric material is compressed.

Figure 7:
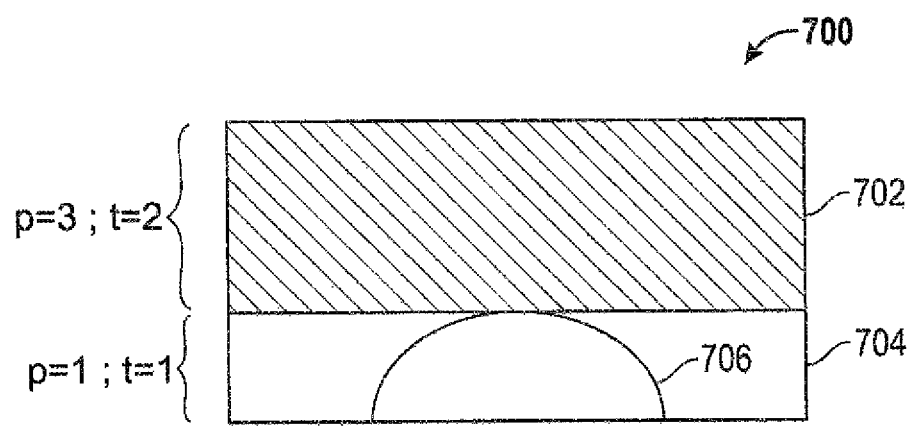
FIG. 7 is a schematic cross section view of a portion of an input sensor stack-up, showing a localized region surrounding an exemplary spacer dot and elastomeric layer without applied force in accordance with an embodiment.

FIG. 7 is a schematic cross section view of a portion of an input sensor stack-up 700, showing a an elastomeric layer and an exemplary spacer dot in the absence of applied force. More particularly, stack-up 700 includes an elastomeric layer 702, a spacer dot 706, and an air gap 704. In the illustrated example, the elastomeric layer 702 has a dielectric constant (permittivity "p") of 3, and a thickness t of 2 dielectric thickness units; air gap 704 is characterized by a dielectric constant (permittivity "p") of 1, and a thickness t of 1 dielectric thickness unit. That is, the elastomeric layer 702 represents 2 dielectric thickness units of permittivity 3, and the air gap 704 represents 1 dielectric thickness unit of permittivity 1.

For a parallel plate capacitor, capacitance is proportional to permittivity and inversely proportional to the separation between the plates. Thus, it can be said that the air gap 704 (1 thickness unit of permittivity 1) is equivalent to 3 thickness units of permittivity 3. Accordingly, the effective permittivity of the stack-up 700 is equal to a total of 5 thickness units of permittivity 3 (3 thickness units of permittivity 3 attributable to the air gap, plus 2 thickness units of permittivity 3 attributable to the elastomer).

Figure 8:
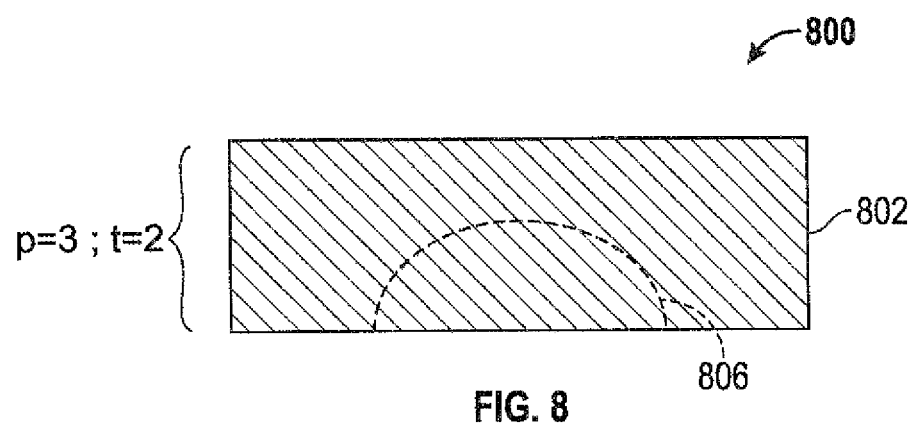
FIG. 8 is a schematic cross section view of the stack-up of FIG. 7 showing the elastomer filling the volume around the spacer dot responsive to applied force in accordance with an embodiment.

FIG. 8 is a schematic cross section view of the stack-up of FIG. 7 showing the spacer dot penetrating the elastomer and the elastomer filling the volume around the spacer dot responsive to applied force corresponding to a force level $F_1$ (see FIG. 6). More particularly, a stack-up 800 shows a spacer dot 806 surrounded by an elastomeric layer 802, with no air gap. The effective permittivity of the stack-up 800 is characterized by 2 thickness units of permittivity 3. FIGS. 7 and 8 illustrate going from 5 thickness units of permittivity 3 (stack-up 700) to 2 thickness units of permittivity 3 (stack-up 800), which corresponds to a difference of 3 thickness units (5−3=2), while only compressing the stack-up by a single thickness unit (3−2=1).

In an embodiment, the thickness (height) of the spacer dots may be in the range of about 50 micrometers to about 250 micrometers, and the thickness of the elastomeric layer may be in the range of about twice the thickness of the spacer dots, although other dimensions are possible and contemplated by this disclosure.

An input device for an electronic system is thus provided which includes a pliable component having an input surface and a first plurality of sensor electrodes configured to sense input objects proximate the input surface; a support substrate spaced apart from the pliable component and having a second plurality of sensor electrodes configured to detect a force imparted to the input surface; and a spacing layer disposed between the pliable component and the support substrate, the spacing layer including a elastomeric sublayer and a plurality of rigid dots.

In an embodiment, the first plurality of sensor electrodes comprises at least one electrode configured to transmit a sensing signal and at least one electrode configured to receive a first type of resulting signal, and the second plurality of sensor electrodes comprises at least one electrode configured to receive a second type of resulting signal. In addition, the first type of resulting signal may comprise effects of input objects proximate the touch surface, and the second type of resulting signal may comprise effects of a force applied to the input surface.

In another embodiment, the plurality of rigid dots extends from a surface of the pliable component, and at least a first subset of the first plurality of electrodes is interposed between the rigid dots.

In another embodiment, at least a first subset of the first plurality of electrodes overlaps at least a portion of the rigid dots.

In a further embodiment, the elastomeric substrate is adjacent to the support substrate and overlays the second plurality of sensor electrodes.

In yet a further embodiment, the plurality of rigid dots extends from a surface of the support substrate, at least a first subset of the second plurality of electrodes is interposed between the rigid dots, and at least a first subset of the second plurality of electrodes overlaps at least a portion of the rigid dots In another embodiment, the elastomeric substrate is adjacent to the pliable component and overlays at least a portion of the first plurality of sensor electrodes.

In an embodiment, the spacing layer comprises a gas disposed in the volume surrounding the rigid dots. In response to pressure applied to the input surface, the elastomeric substrate is configured to deform into a portion of the volume, locally displacing the gas.

In a further embodiment, in response to applied pressure, the measured capacitance between the at least one electrode configured to transmit a sensing signal and the at least one electrode configured to receive a second type of resulting signal changes substantially at least in part due to an increase in the effective dielectric constant associated with the region between the least one electrode configured to transmit a sensing signal and the at least one electrode configured to receive a second type of resulting signal.

In an embodiment, the elastomeric substrate is characterized by a dielectric constant in the range of 2 to 3 (and for neoprene about 7), the gas is characterized by a dielectric constant of about 1, the height of the rigid dots is in the range of about 50 to 250 microns, and the ratio of the thickness of the elastomeric sub-layer to dot height is in the range of about 1.5:1 to 3:1.

In another embodiment, the pliable component comprises at least one substrate, and the least one electrode configured to transmit a sensing signal and the at least one electrode configured to receive a second type of resulting signal are arranged on one of: a single side of the at least one substrate; opposing sides of the at least one substrate; or on separate substrates.

In an embodiment, the input device further includes a processing system communicatively coupled to the first and second plurality of sensor electrodes, the processing system comprising a sensor module configured to: drive a sensing signal onto the first subset of the first plurality of sensing electrodes; receive a first type of resulting signal from a second subset of the first plurality of sensing electrodes; and receive a second type of resulting signal from the second plurality of sensor electrodes. The processing system may also include a determination module configured to determine positional information and force information for input objects in the sensing region from the first and second types of resulting signals.

In a further embodiment, the first and second resulting signals correspond to the same driven signal.

An input device is also provided which includes a pliable layer having a first plurality of sensor electrodes configured to detect input objects in a sensing region of the input device, the first plurality of sensor electrodes including a subset of transmitter electrodes. The input device also includes a support substrate having a second plurality of sensor electrodes configured to detect a force imparted to the input surface and configured for capacitive coupling with the subset of transmitter electrodes; a spacing layer including an elastomeric dielectric sub-layer and a microstructure sub-layer having a plurality of microstructures surrounded by a gas, the spacing layer disposed between the pliable layer and the support substrate and configured to compress in response to force applied to the input surface; and a processing system communicatively coupled to the first and second plurality of electrodes. In an embodiment, the processing system is configured to drive a sensing signal onto the subset of transmitter electrodes, and receive a resulting signal, which includes effects of applied force on the input surface, from the second plurality of sensing electrodes. In an embodiment, the resulting signal represents a change in capacitive coupling between the transmitter electrodes and the second plurality of sensor electrodes.

In a further embodiment, the elastomeric dielectric sub-layer is characterized by a first electrical permittivity and the gas is characterized by a second electrical permittivity less than the first electrical permittivity, wherein the change in capacitive coupling between the transmitter electrodes and the second plurality of sensor electrodes is due, at least in part, to a change in the effective electrical permittivity of the spacing layer as a result of the applied force.

A processing system is provided for use with an input device of the type including a plurality of transmitter electrodes, a first plurality of sensor electrodes configured to detect input objects at an input surface, a second plurality of sensor electrodes configured to detect a force imparted to the input surface, and a spacing layer including a flat elastomeric sub-layer and a rigid dot sub-layer surrounded by a gas, the spacing layer disposed between the pliable layer and the support substrate and configured to deflect in response to force applied to the input surface. The processing system may be communicatively coupled to the transmitter electrodes and to the first and second plurality of sensor electrodes and configured to: drive a sensing signal onto the subset of transmitter electrodes; receive a resulting signal from the second plurality of electrodes; and measure a change in capacitive coupling between the transmitter electrodes and the second plurality of sensor electrodes resulting from a change in the effective electrical permittivity of the spacing layer during deflection.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for an electronic system, comprising:
    a pliable component having an input surface, a display and a first plurality of sensor electrodes configured to sense input objects proximate the input surface and update the display, wherein the first plurality of sensor electrodes comprises at least a first subset all driven with a sensing signal and at least a second subset configured to receive a first type of resulting signal;
    a support substrate spaced apart from the pliable component and having a second plurality of sensor electrodes configured to detect a force imparted to the input surface, wherein the second plurality of sensor electrodes comprises at least one electrode configured to receive a second type of resulting signal; and a spacing layer disposed between the pliable component and the support substrate, wherein, in response to a force applied to the input surface of the pliable component, the spacing layer compresses.

2. The input device of claim 1, wherein the spacing layer comprises a gas.

3. The input device of claim 1, wherein the first type of resulting signal comprises effects of input objects proximate the input surface, and wherein the second type of resulting signal comprises effects of the force applied to the input surface.

4. The input device of claim 1, further comprising a plurality of rigid structures disposed in the spacing layer.

5. The input device of claim 4, wherein the second plurality of sensor electrodes is interposed between the plurality of rigid structures.

6. The input device of claim 4, wherein the second plurality of sensor electrodes overlap the plurality of rigid structures.

7. The input device of claim 1, wherein the plurality of rigid structures extend from a surface of the support substrate.

8. The input device of claim 1, wherein the spacing layer comprises a gas disposed in a volume surrounded by a plurality of rigid structures, and further wherein, in response to a pressure applied to the input surface, the pliable component is configured to deform into a portion of the volume, locally displacing the gas.

9. The input device of claim 8, wherein, in response to the force applied to the input surface, the measured capacitance between at least one electrode of the first subset and the at least one electrode configured to receive the second type of resulting signal changes due to an increase in an effective dielectric constant associated with the region between the at least one electrode of the first subset and the at least one electrode configured to receive the second type of resulting signal.

10. The input device of claim 1, wherein the height of the plurality of rigid structures is in the range of about 50 to 250 microns.

11. The input device of claim 1, wherein the at least one electrode configured to transmit the sensing signal and the at least one electrode configured to receive the second type of resulting signal are arranged on one of:
a single side of the display; and
opposing sides of the display.

12. The input device of claim 1, further comprising a processing system communicatively coupled to the first plurality of sensor electrodes and the second plurality of sensor electrodes, the processing system comprising:
a sensor module configured to:
update the display using the first plurality of sensor electrodes;
transmit the sensing signal onto the first subset of the first plurality of sensor electrodes;
receive the first type of resulting signal from the second subset of sensor electrodes; and
receive the second type of resulting signal from the second plurality of sensor electrodes; and
a determination module configured to determine positional information and force information for input objects in a sensing region from the first type of resulting signals and the second type of resulting signal.

13. A processing system for a capacitive touch screen device, the capacitive touch screen device comprising:
a pliable component including a first plurality of sensor electrodes configured to detect input objects in a sensing region of an input device;
a support substrate including a second plurality of sensor electrodes configured to detect a force imparted to an input surface;
a spacing layer disposed between the pliable component and the support substrate wherein the spacing layer is configured to compress in response to force applied to the input surface;
wherein the processing system is configured to:
transmit a sensing signal onto a first subset of the first plurality of sensor electrodes;
receive a first resulting signal from a second subset of the first plurality of sensor electrodes, the first resulting signal including effects of the sensing signal and objects on the input surface of the device; and
receive a second resulting signal from at least a subset of the second plurality of sensor electrodes, the second resulting signal including effects of a change in capacitive coupling in response to the force applied to the input surface.

14. The processing system of claim 13, further configured to update a display of the capacitive touch screen device.

15. The input device of claim 14, wherein the first type of resulting signal and the second type of resulting signal correspond to the same driven sensing signal.

16. The processing system of claim 14, wherein at least a portion of the first plurality of sensor electrodes are used to update the display.

17. The processing system of claim 14, further configured to update the display based on positional information and force information determined from the first resulting signal and the second resulting signal.

* * * * *